United States Patent
Billester

(10) Patent No.: US 7,120,302 B1
(45) Date of Patent: Oct. 10, 2006

(54) METHOD FOR IMPROVING THE ACCURACY OF CHARACTER RECOGNITION PROCESSES

(75) Inventor: Stephen E. M. Billester, Bothell, WA (US)

(73) Assignee: RAF Technology, Inc., Redmond, WA (US)

( * ) Notice: Subject to any disclaimer, the term of this patent is extended or adjusted under 35 U.S.C. 154(b) by 607 days.

(21) Appl. No.: 09/919,769

(22) Filed: Jul. 31, 2001

Related U.S. Application Data

(60) Provisional application No. 60/221,695, filed on Jul. 31, 2000.

(51) Int. Cl.
G06K 9/72 (2006.01)

(52) U.S. Cl. ...................... 382/229; 382/228

(58) Field of Classification Search ................ 382/229, 382/227
See application file for complete search history.

(56) References Cited

U.S. PATENT DOCUMENTS

| | | | | |
|---|---|---|---|---|
| 3,259,883 | A | 7/1966 | Rabinow et al. | 340/146.3 |
| 3,533,068 | A | 10/1970 | Hanaki et al. | 340/146.3 |
| 3,641,495 | A | 2/1972 | Kiji | 340/146.3 |
| 3,764,978 | A | 10/1973 | Tyburski et al. | 340/146.3 D |
| 3,764,980 | A | 10/1973 | Dansac et al. | 340/146.3 |
| 3,839,702 | A | 10/1974 | Chaires et al. | 340/146.3 S |
| 3,949,363 | A | 4/1976 | Holm | 340/146.3 D |
| 3,988,715 | A * | 10/1976 | Mullan et al. | 382/228 |
| 4,058,795 | A | 11/1977 | Balm | 340/146.3 WD |
| 4,132,978 | A | 1/1979 | Mercier | 340/146.3 |
| 4,524,453 | A | 6/1985 | Egami et al. | 382/1 |
| 4,654,875 | A | 3/1987 | Srihari et al. | 382/40 |
| 4,876,735 | A | 10/1989 | Martin et al. | 382/57 |
| 4,958,379 | A | 9/1990 | Yamaguchi et al. | 382/59 |
| 4,979,227 | A | 12/1990 | Mittelbach et al. | 382/40 |
| 5,048,113 | A | 9/1991 | Yamagata et al. | 382/57 |
| 5,077,809 | A | 12/1991 | Ghazizadeh | 382/33 |
| 5,261,009 | A * | 11/1993 | Bokser | 382/230 |
| 5,280,531 | A | 1/1994 | Hunter | 382/1 |
| 5,418,864 | A | 5/1995 | Murdock et al. | 382/309 |
| 5,455,872 | A | 10/1995 | Bradley | 382/228 |
| 5,459,739 | A | 10/1995 | Handley et al. | 371/36 |
| 5,519,786 | A | 5/1996 | Courtney et al. | 382/159 |
| 5,555,325 | A | 9/1996 | Burger | 382/309 |
| 5,745,590 | A | 4/1998 | Pollard | 382/101 |
| 5,787,202 | A | 7/1998 | Ueno | 382/227 |
| 5,805,747 | A | 9/1998 | Bradford | 382/310 |
| 5,809,183 | A | 9/1998 | Serizawa et al. | 382/301 |

(Continued)

FOREIGN PATENT DOCUMENTS

JP 02058187 A * 2/1990

(Continued)

*Primary Examiner*—Samir Ahmed
*Assistant Examiner*—Charles Kim
(74) *Attorney, Agent, or Firm*—John R. Thompson; Stoel Rives LLP

(57) ABSTRACT

The present invention embodies a character recognition method for constructing a result string from a plurality of result sets. Each result set comprises at least one candidate character, and each candidate character has an associated confidence indication. The method can begin by selecting a plurality of character types. For each selected character type, a candidate string can be created by concatenating a candidate character of the selected character type from each result set. The associated confidence indication for each concatenated candidate character can be combined to form a corresponding combined confidence indication for each created candidate string. The created candidate string with the most favorable corresponding combined confidence indication can be selected as the result string.

10 Claims, 3 Drawing Sheets demonstrating choosing among lookalike characters by assuming that all characters in a word are of the same type

U.S. PATENT DOCUMENTS

| | | | |
|---|---|---|---|
| 5,850,480 A | * 12/1998 | Scanlon | 382/229 |
| 5,887,072 A | 3/1999 | Bashomatsu et al. | 382/101 |
| 5,970,171 A | 10/1999 | Baraghimian et al. | 382/187 |
| 6,125,208 A | 9/2000 | Maier et al. | 382/228 |

FOREIGN PATENT DOCUMENTS

| | | |
|---|---|---|
| JP | 3212779 | 9/1991 |

* cited by examiner

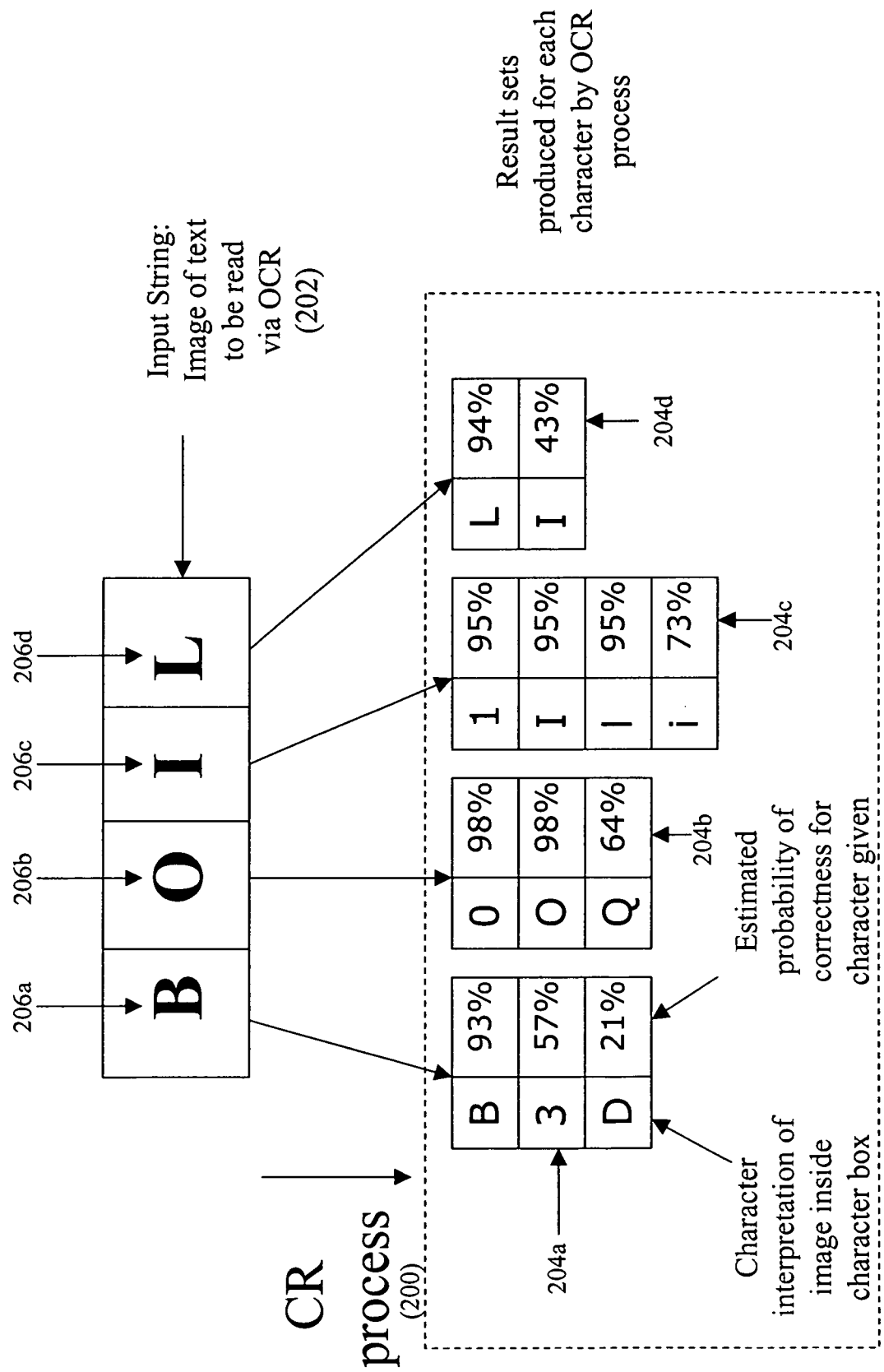
Figure 2 – demonstrating result sets produced by character recognition

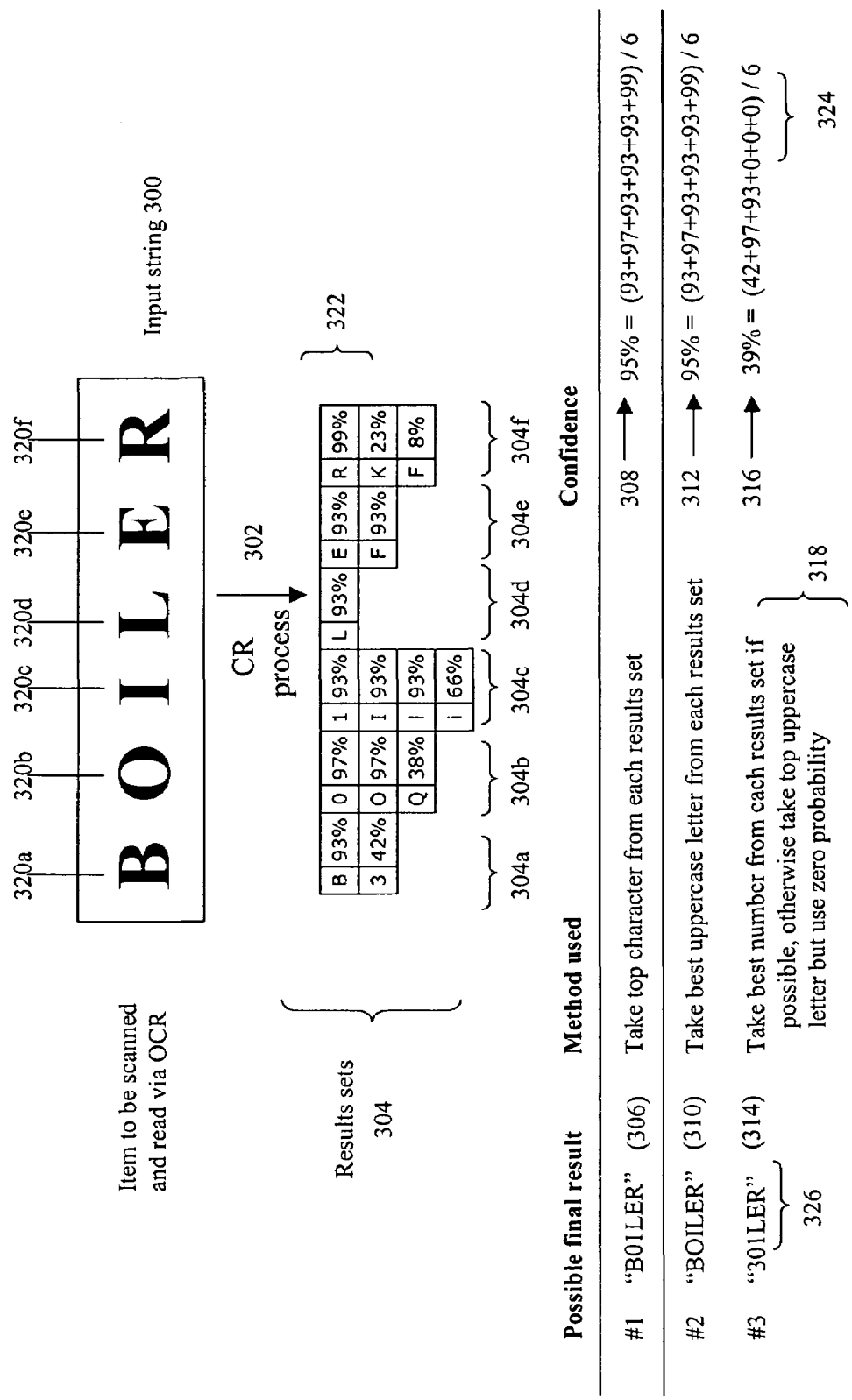
Figure 3 – demonstrating choosing among lookalike characters by assuming that all characters in a word are of the same type

METHOD FOR IMPROVING THE ACCURACY OF CHARACTER RECOGNITION PROCESSES

RELATED APPLICATIONS

This application claims priority from U.S. Provisional Patent Application No. 60/221,695, filed Jul. 31, 2000.

COPYRIGHT NOTICE

© 2001 RAF Technologies, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d) & (e).

TECHNICAL FIELD

The present invention relates to the field of character recognition technology and, in particular, to a method for accurately constructing a result string from an input string using combined confidence indications for alternate versions of the result string to help resolve ambiguous characters.

BACKGROUND OF THE INVENTION

In the field of automated character recognition processing, individual input pieces comprising an input stream undergo processing in order to identify characters or character strings contained within the input pieces. Characters can be alphabetic, numeric, symbolic, punctuation marks, etc., and they may be hand written or machine printed. Examples of typical input pieces can include data forms, mail envelopes, bank checks, or several other types of documents or items that have characters for recognition.

Depending on the particular type of input stream, a single character may be the subject of the recognition procedures, or several characters may be combined together into a character string that is to be recognized. The recognition process may occur using various well-known technologies. For example, with optical character recognition technology, a scanner is used to scan the light and dark areas of a character on the input piece and generate a corresponding digital representation of that character. In magnetic character recognition, a magnetic reader or sensor is used to create a digital representation of characters printed with magnetic ink.

In typical practice, character recognition processing generates result strings (strings of recognized characters) which are generally quite close to what is actually on the input piece. However, it is not unusual for character recognition processes to have uncertainty about some characters. A typical cause for error in a character recognition engine result string is poor quality or lack of clarity in the original input piece. Poor printing, sloppy handwriting, smearing, stray marks or lines, or printing atop of graphics, form background, or colored or shaded areas can all cause errors in the recognition process. One common problem is that of being unable to determine which of two or more very similar characters is correct.

Manufacturers of character recognition engines have adopted various techniques to improve character recognition results. Existing techniques, however, have significant limitations. For example, one known technique is to generate multiple character possibilities for each potentially ambiguous character being recognized. A probability or confidence indication is then assigned to each result possibility. The character with the highest confidence is then selected for the result output. While this technique can improve results in some circumstances, it is typically not helpful in situations that require distinguishing between very similar characters (such as the uppercase letter "O" and the digit "0," or the upper letter "I," the digit "1," and the lowercase letter "l"). Each of these similar characters may have very similar, if not identical, confidence indications. Simply picking the highest probability character does not always result in a correct result string.

Another known technique is to obtain a result string (such as a word) through recognition processing and then validate the result string against a database of known or acceptable result strings (such as a word dictionary or other type of "look-up" dictionary) to determine whether the result is valid. While this technique provides some measure of objective validation, it is only available if there is a dictionary available. In applications for which there is no look-up dictionary or other objective reference available, other solutions must be provided to improve the accuracy of result strings.

What is needed, is a system and procedure for character recognition that generates result strings with increased accuracy in applications for which the prior techniques are either unavailable or unhelpful. The present invention fulfils this need.

SUMMARY OF THE INVENTION

An embodiment of the present invention embodies a character recognition method for accurately constructing a result string from a plurality of result sets generated by processing an input string. Each result set comprises at least one candidate character, and each candidate character has an associated confidence indication. A method consistent with the present invention can begin by selecting a plurality of character types. Examples of character types include numeric, uppercase, lowercase, small caps, symbolic, and proper case characters, etc. For each selected character type, a candidate string can be created by concatenating a candidate character of the selected character type from each result set. Accordingly, there can be as many candidate strings as there are selected character types. The associated confidence indication for each concatenated candidate character can be combined to form a corresponding combined confidence indication for each created candidate string. The created candidate string with the most favorable corresponding combined confidence indication, be it numerically or otherwise indicated, can be selected as the result string.

One particularly valuable aspect of the present invention is that it can provide improved results even in applications for which there is no look-up dictionary or other reference available to objectively validate the recognized result string. Additional aspects and advantages of this invention will be apparent from the following detailed description of preferred embodiments thereof, which proceeds with reference to the accompanying drawings.

BRIEF DESCRIPTION OF THE DRAWINGS

FIG. 2 illustrates the concept of result sets produced by the character recognition process of FIG. 1.

FIG. 3 illustrates the process of choosing from among similar-looking characters by constructing and evaluating candidate character strings comprising characters all of the same character type.

DETAILED DESCRIPTION OF PREFERRED EMBODIMENT

Figure 1:
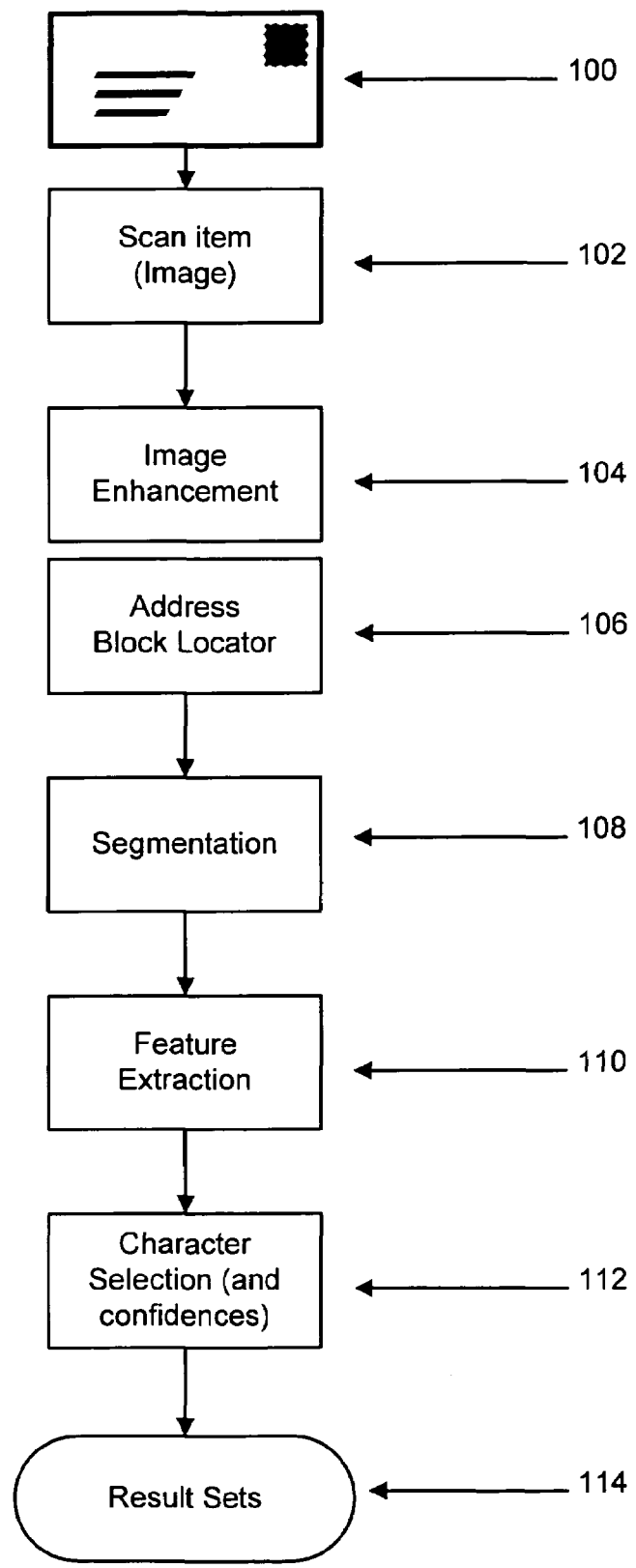
FIG. 1 exemplifies components of a character recognition process implemented with the present invention.

A preferred embodiment of the present invention can be described with reference to FIG. 1, which illustrates an example of components in a character recognition process. The process indicated in FIG. 1 is depicted as an optical character recognition process operated on an input piece (such as the mailing address block of a mail envelope) 100. In addition to a mail envelope, countless other types of input pieces could be used. Other examples include bank checks, various forms, and almost any other type of document with data to be extracted. The input piece 100 then is scanned or otherwise captured in a digital form 102. Next, the scanned image 102 is processed with an image enhancement step 104 and the address block is located 106. Alternative component steps or arrangements could also be used during the initial stages of image enhancement 104 and address block location 106. For example, the steps could be subdivided or additional steps could be implemented to provide a rough, initial image enhancement, followed by location of the address block. After the address block is located, the character recognition process could conduct additional, more detailed image enhancement specifically on the address block. A similar system could be adopted for any input character string, and the current procedure is not limited to processing a multi-line character string in the form of a mailing address.

The next step in a typical character recognition process can be segmentation 108. Segmentation divides character strings into each individual character for recognition purposes. Feature extraction 110 can also be part of the recognition process to help distinguish characters and highlight the aspects that make a character unique. The character selection and confidence indication step 112 determines the most likely candidate characters representing each character found in the character string of the digital image 102. The character selection and confidence indication step 112 allows for the generation of a character set 114. A typical character set 114 can include candidate characters with associated confidence indications for each character in the character string of the digital image 102. While FIG. 1 illustrates one example of a character recognition process, other processes can have more, fewer, or substitute components. It should also be noted that character recognition can be applied in several contexts outside the realm of mail address recognition. Various recognition technologies, such as optical character recognition, magnetic ink character recognition, or other forms of intelligent character recognition, may also be applied. The present invention encompasses all such alternative embodiments.

In a typical character recognition application, the recognition procedure generates results (strings of characters) which are generally quite close to what is actually on the input piece. However, it is not unusual for the character recognition process to have uncertainty about some characters. For this reason, characters are sometimes misrecognized, resulting in the improper substitution of other characters. In order to track and convey the uncertainties in the results, character recognition engines typically produce, for each input character, a set of candidate characters and some associated probability or confidence indication for each candidate character. The confidence indication provides a measure, quantitative or qualitative, of how confident the system is that it successfully recognized the input character. The set of candidate characters and associated confidences can then be sorted according to the probability of match, typically, from best to worst. This organization scheme can be referred to as a "result set". Unfortunately, some characters are so difficult to tell apart, particularly in some fonts, that they will occur in the result set with almost or exactly the same confidence indication. A good example of this is the letter "O" and the digit "0," which are identical or almost identical in some fonts. Another good example is the uppercase letter "I," the lowercase letter "l," the digit "1," and, sometimes, the lowercase letter "i," which are visually very similar in many fonts. Examples of similar groupings where the characters are not quite so alike, and hence may often occur in the results set with sometimes considerably different probabilities, are the uppercase letter "B" and the digit "8," or the lowercase "b," the digit "6," and, to a lesser extent, the lowercase letter "h". An example of typical result sets for characters comprising the word "BOIL" is illustrated in FIG. 2.

FIG. 2 illustrates the creation of result sets by a character recognition process. In FIG. 2, the character recognition process 200 receives a digital representation of an input string 202 to generate result sets 204a through 204d for each corresponding character 206a through 206d of the input string 202. In the graphical representation of FIG. 2, each result set is designated in a tabular form comprising two columns and as many rows as there are candidate characters generated by the character recognition process for that specific result set. The first column in each result set presents the candidate characters. The second column presents the associated confidence indication for each candidate character. It should also be noted that while FIG. 2 illustrates associated confidence indications in a quantitative context, with numeric values, any type of confidence indication could also be used (such as qualitative descriptive terms). As stated above, the candidate characters in a result set 204a through 204d are organized in descending order from highest confidence indication to lowest confidence indication. Any other suitable organizational method could also be implemented within the scope of the invention.

The input string 202 of FIG. 2 also contains two ambiguous characters, 206b and 206c. The uppercase letter "O" character 206b of the input string 202 generates a result set 204b of candidate characters including the digit "0" with an associated confidence indication of 98 percent, the uppercase letter "O" with an associated confidence indication of 98 percent, and the uppercase letter "Q" with an associated confidence indication of 64 percent. Similarly, the uppercase letter "I" character 206c of the input string 202 generates a result set 204c with a numeral "1" and an associated confidence indication of 95 percent, a uppercase letter "I" and an associated confidence indication of 95 percent, a lowercase letter "l" and a confidence indication of 95 percent, and a lowercase "i" and a confidence indication of 73 percent. The result sets 204a through 204d of FIG. 2, and the individual candidate characters and associated confidence indications they include, can then be used to generate an accurate result string.

FIG. 3 illustrates a procedure for creating an accurate result string according to an embodiment of the present invention. It demonstrates choosing among similar looking characters by assuming that all characters in the character string are of the same character type. Examples of character types include numbers, uppercase, small caps, proper case, or lowercase characters, or characters belonging to any of several other predefined symbol or letter sets (including multiple languages, proper names, or specific alphanumeric character types—such as Canadian postal codes). The input string 300 in FIG. 3 includes six characters 320a through 320f comprising the word "BOILER" as an input string 300. The input string 300 is subjected to a character recognition process 302 to yield a plurality of result sets 304. The individual results sets 304a through 304f correspond to the original input characters 320a through 320f. Result set 304d contains only one candidate character, the uppercase letter "L". This indicates that the initial character 320d was not determined to be ambiguous by the character recognition process 302. On the other hand, the uppercase letter "I" input character 320c generated a result set 304c with four candidate characters, three of which had an identical confidence indication. This indicates that the letter "I" was highly ambiguous to the character recognition process 302.

Candidate strings can be generated from the candidate characters in the result sets 304a through 304f. The first string indicated as a possible final result string 306 was constructed by concatenating the candidate character from each result set 304a through 304f that had the highest associated confidence indication 322. Where two or more candidate characters had an identical confidence indication, the candidate character higher in the result set table was selected 322. Although the first possible final result string 306 generated a high combined candidate indication 308 of 95 percent, the result string is incorrect. It incorrectly incorporates two numbers along with the letters to proffer "B01LER" as the first possible result string 306. However, by making a simple assumption that all characters in the initial input string 300 were of the same type, a more accurate result string can be obtained.

FIG. 3 also illustrates two candidate strings constructed according to a preferred embodiment of the present invention. In a preferred embodiment, the first step is to select a character type. In FIG. 3, the second candidate string 310 is constructed using uppercase letters as the character type. The third candidate string 314 is constructed using numerals as the character type.

The second candidate string 310 is constructed by concatenating the uppercase letter with the most favorable confidence indication from each of the result sets 304a through 304f. For example, in the result set 304a for the input character "B" 320a, the best uppercase letter is the uppercase letter "B" with an associated confidence indication of 93 percent. In the result set 304b for the input character "O" 320b, the best uppercase candidate character is the letter "O," with an associated confidence indication of 97 percent (which is a more favorable confidence indication than the 38 percent associated with the uppercase candidate character "Q"). Continuing through each of the result sets 304a through 304f in this matter allows the candidate string 310 to be concatenated from each of the candidate characters with the most favorable associated confidence indication for each selected character type.

The third candidate string 314 is created by concatenating the best numeric candidate character from each result set 304a through 304f. FIG. 3 also illustrates the implementation of contingency rules for use in concatenating the character string. For example, in creating the third candidate string 314, a contingency rule 318 is applied whereby if a result set 304a through 304f does not include a candidate character of the selected character type, a substitute character (an uppercase letter in FIG. 3) can be used in concatenating the candidate string 314. Although the substitute character can be included in the candidate string 314, a confidence indication of less than the original associated confidence indication can be ascribed to the substitute character. This accounts for the fact that the substitute character is being included as a default selection in a string of characters of a different type. A benefit of using a substitute character is that it allows the candidate strings 310 and 314 to contain the same number of characters. Having the same number of characters in the candidate strings 310 and 314 facilitates comparison of weighted averages for each of the candidate strings confidence indications (as described below). In FIG. 3, a confidence indication of zero is ascribed for substitute characters 318.

Once the candidate strings 310 and 314 have been concatenated, a combined confidence indication 312 and 316 is calculated for each candidate string 310 and 314. Any type of mathematical formulation can be used, as long as it indicates a combined confidence indication for each candidate string 310 and 314. In a preferred embodiment, a weighted averaging system is used. As is illustrated in FIG. 3, the combined confidence indication 312 for the second candidate string 310 is the sum of the associated confidence indications for each of the candidate characters comprising the candidate string 310, divided by the total number of candidate characters in the candidate string 310. The same formulation is applied to calculate the combined confidence indication 316 for the third candidate string 314. The calculation for the third combined confidence indication 316 in FIG. 3 illustrates the use of ascribed confidence indications (e.g., zero) 324 for substitute candidate characters 326 in the character string 314. Once the combined confidence indications 312 and 316 have been calculated, a result string can be selected as the candidate string 310 and 314 with the highest combined confidence indication 312 and 316. In FIG. 3, the second candidate string 310 is selected as the result string because its combined confidence indication 312 is more favorable than the combined confidence indication 316 of the third candidate string 314. Due to the fact that numeric confidence indications are used, the second candidate string 310 is selected as the result string because its combined confidence indication of 95 percent 312 is a higher numeric confidence indication than the combined confidence indication of 39 percent 316 for the third candidate string 314.

It is important to note that, in certain circumstances, the selected character type can require concatenation of candidate characters that may independently appear to belong to multiple character types. As used in this specification and the attached claims, the term "character type" is used in this broad context and includes character types that give consideration to any known or suspected pattern of characters comprising the a character string as a whole. For example, the "proper case" character type is commonly found in several mail and form processing character recognition applications. Proper names, like "George," provided one illustration of a proper case character type, meaning that the first character in the word is uppercase and the subsequent characters are lowercase. Applying the method described for FIG. 3, including adopting contingency rules, and selecting proper case as the character type, would result in creation of the candidate string "BOiLER," with a confidence indication of 26%=(93+0+66+0+0+0)/6. Thus, a proper case candidate string would not be selected as the result string in the example illustrated in FIG. 3, because of its low combined confidence indication. However, with proper case strings like "George" or "Mary," a proper case candidate string will typically produce the highest combined confidence indication.

The prior example illustrates the flexibility afforded to embodiments of the present invention. By knowing some information about what type of input string is expected, a character type can be selected to optimize the accuracy of the final result string. Similarly, a wide variety of multiple character types can be selected and applied for a single input string if the type of input string is either unknown or widely varied. Character types can be defined so that the extraction of candidate characters from the result sets can be controlled not just by proper case rules, as described above, but by any other known or suspected pattern in the input string. In this manner, a character type can be defined, or custom-created, for any known or suspected type of input string. For instance, Canadian postal codes, such as "V5G2K6," have a pattern of alternating uppercase letters and numbers.

For character recognition systems processing Canadian postal input strings, a "Canadian post" character type can be selected (or defined, if it does not already exist). Part of the definition of the character type includes designating other character types that are subsets of the selected character type and the position at which those other character types are expected in the input character string. In addition to designating a fixed position where a subset character type is expected, a pattern can be designated. An example of this would be alternating numbers and letters, beginning with a number initially, regardless of the character string length. Combining a pattern of multiple subset character types into a single character type can also be used with symbol character types. Examples include instructing a character recognition engine to expect groups of three, two, and four numbers, separated by dashes, if the input string includes United States social security numbers, or numbers separated by parentheses and dashes, if the input string includes United States phone numbers.

Continuing with the Canadian post example, the "Canadian post" character type can be thought of as a superset to the two subset character types: uppercase and numeric. The Canadian post character type also extracts candidate characters from the result sets using the subset character types in an expected order (i.e., uppercase, numeric, uppercase, numeric, uppercase, numeric). Applying character types that employ a known or suspected pattern in the selection of candidate characters will typically produce a final candidate string with a high combined confidence indication if the input string is, in fact, of that type. Otherwise, a lower combined confidence indication will be produced.

In the application illustrated in FIG. 3, a preferred embodiment of the present invention accurately constructed the result string, "BOILER," from result sets 304a through 304f that would have generated an incorrect result string of "B01LER" 306 had simply the candidate character with the highest confidence indication or highest placement in each result set been used to concatenate the result. This aspect of the present invention provides a significant advantage over the prior art. Additionally, the present invention operates effectively and provides a method for improving result string accuracy in applications for which there is no look-up dictionary or other reference available to objectively verify the result strings, which is the most difficult case for improving the accuracy of results.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A character recognition method for accurately constructing a result string, the method comprising the steps of:
   generating a digital representation of an input string including characters;
   generating a result set for each character in the input string, each result set including a plurality of candidate characters and a plurality of associated confidence indications;
   selecting a plurality of character types;
   for a first selected character type, creating a first candidate string by concatenating candidate characters with a most favorable corresponding confidence indication of the first selected character type from each result set;
   for a second selected character type, creating a second candidate string by concatenating candidate characters with a most favorable corresponding confidence indication of the second selected character type from each result set;
   if there is no candidate character for the first candidate string in a result set for the first selected character type, extracting a substitute candidate character of the second selected character type;
   concatenating the substitute candidate character with candidate characters with a most favorable corresponding confidence indication of the first selected character type from each result set to thereby form the first candidate string;
   ascribing a substitute associated confidence indication for the substitute candidate character;
   for the first and second candidate strings, combining the associated confidence indication for each concatenated candidate character to form a corresponding combined confidence indication; and
   selecting as the result string the created candidate string with a most favorable corresponding combined confidence indication.

2. The method of claim 1, wherein the substitute candidate character corresponds to a most favorable corresponding confidence indication of the second selected character type for the result set.

3. The method of claim 1, wherein:
   each confidence indication is numeric; and
   the most favorable corresponding combined confidence indication has a greatest combined value.

4. The method of claim 1, wherein the first selected character type includes a plurality of subset character types.

5. The method of claim 4, wherein the first selected character type further includes a pattern for positioning the candidate characters of the plurality of subset character types.

6. A computer readable medium having computer instruction code for performing a method of character recognition to accurately construct a result string, the method comprising:
   generating a digital representation of an input string including characters;
   generating a result set for each character in the input string, each result set including a plurality of candidate characters and a plurality of associated confidence indications;
   selecting a plurality of character types;
   for a first selected character type, creating a first candidate string by concatenating candidate characters with a most favorable corresponding confidence indication of the first selected character type from each result set;

for a second selected character type, creating a second candidate string by concatenating candidate characters with a most favorable corresponding confidence indication of the second selected character type from each result set;

if there is no candidate character for the first candidate string in a result set for the first selected character type, extracting a substitute candidate character of the second selected character type;

concatenating the substitute candidate character with candidate characters with a most favorable corresponding confidence indication of the first selected character type from each result set to thereby form the first candidate string;

ascribing a substitute associated confidence indication for the substitute candidate character;

for the first and second candidate strings, combining the associated confidence indication for each concatenated candidate character to form a corresponding combined confidence indication; and selecting as the result string the created candidate string with a most favorable corresponding combined confidence indication.

7. The computer readable medium of claim 6, wherein the substitute candidate character corresponds to a most favorable corresponding confidence indication of the second selected character type for the result set.

8. The computer readable medium of claim 6, wherein:

each confidence indication is numeric; and the most favorable corresponding combined confidence indication has a greatest combined value.

9. The computer readable medium of claim 6, wherein the first selected character type includes a plurality of subset character types.

10. The computer readable medium of claim 9, wherein the first selected character type further includes a pattern for positioning the candidate characters of the plurality of subset character types.

* * * * *

UNITED STATES PATENT AND TRADEMARK OFFICE
CERTIFICATE OF CORRECTION

PATENT NO.        : 7,120,302 B1
APPLICATION NO.   : 09/919769
DATED             : October 10, 2006
INVENTOR(S)       : Stephen E. M. Billester It is certified that error appears in the above-identified patent and that said Letters Patent is hereby corrected as shown below:

Column 1, line 65, "Manufacturers of character . . ." change to --Manufactures of character--

Column 2, line 10, ". . . upper letter "I," . . . " change to --uppercase letter "I"--

Column 2, line 26, "What is needed, is a . . ." change to --What is needed is a--

Column 4, line 18, ". . . in the results set with . . ." change to --in the result set with--

Column 4, line 55, ". . . a uppercase letter . . ." change to --an uppercase letter--

Column 5, line 10, ". . . individual results sets . . ." change to --individual result sets--

Column 5, line 29, ". . . a high combined candidate indication 308. . ." change to --a high combined confidence indication 308--

Column 6, line 33, ". . . character string 314." change to --candidate string 314.--

Column 6, line 54, ". . . the a character string as a whole . . ." change to --the character string as a whole--

Signed and Sealed this

Eighth Day of May, 2007

JON W. DUDAS
*Director of the United States Patent and Trademark Office*